(12) United States Patent
Takahashi et al.

(10) Patent No.: US 10,742,669 B2
(45) Date of Patent: Aug. 11, 2020

(54) MALWARE HOST NETFLOW ANALYSIS SYSTEM AND METHOD

(71) Applicant: NTT Security Corporation, East Palo Alto, CA (US)

(72) Inventors: Kenji Takahashi, Palo Alto, CA (US); Marek Niedzwiedz, Palo Alto, CA (US); Michal Tadeusiak, Palo Alto, CA (US); Jan Milczek, Palo Alto, CA (US); Szymon Nakonieczny, Palo Alto, CA (US); Jakub Czakon, Palo Alto, CA (US)

(73) Assignee: NTT Security Corporation, East Palo Alto, CA (US)

( * ) Notice: Subject to any disclaimer, the term of this patent is extended or adjusted under 35 U.S.C. 154(b) by 142 days.

(21) Appl. No.: 15/673,341

(22) Filed: Aug. 9, 2017

(65) Prior Publication Data
US 2019/0052652 A1 Feb. 14, 2019

(51) Int. Cl.
*H04L 29/06* (2006.01)
*G06N 20/00* (2019.01)
*G06N 5/04* (2006.01)

(52) U.S. Cl.
CPC .......... *H04L 63/1416* (2013.01); *G06N 5/04* (2013.01); *G06N 20/00* (2019.01); *H04L 63/0236* (2013.01); *H04L 63/101* (2013.01)

(58) Field of Classification Search
CPC .............. H04L 63/1416; H04L 63/101; H04L 63/0236; G06N 5/04; G06N 20/00
USPC ........................................................ 726/23
See application file for complete search history.

(56) References Cited

U.S. PATENT DOCUMENTS

| 2012/0005755 | A1* | 1/2012 | Kitazawa | G06F 21/56 726/24 |
| 2013/0074186 | A1* | 3/2013 | Muttik | G06F 21/51 726/24 |
| 2017/0063893 | A1* | 3/2017 | Franc | H04L 63/0281 |

OTHER PUBLICATIONS

Website Traffic, Statistics and Analytics @ Alexa—Webpage: https://www.alexa.com/siteinfo retrieved from the internet dated 01/360/18 (5 pgs.).

* cited by examiner

*Primary Examiner* — Kambiz Zand
*Assistant Examiner* — Benjamin A Kaplan
(74) *Attorney, Agent, or Firm* — DLA Piper LLP (US)

(57) ABSTRACT

A system and method for determining malware threats based on behavior of a host/IP address uses netflow data, white lists, black lists and machine learning classification with a model. A white list generation method may be used and a machine learning model validation method.

16 Claims, 6 Drawing Sheets

400 get_whitelists(*time_period, minimum_connections, most_frequent_ip_range, number_of_ip*):

*ip_whitelist* ← get IPs from a public whitelist source, sorted according to a connections frequency in descending order     *ip_whitelist* ← sample *number_of_ip* addresses from *ip_whitelist[most_frequent_ip_range]*

*ip_time_period* ← get addresses from *ip_whitelist* satisfying a *minimum_connections* number within a *time_period* for *ip* in *ip_time_period*:

*features[ip]* = get_features_from_flow(*ip, time_period*)

return *features* get_random_whitelists(*time_period, minimum_connections, number_of_ip*):

*ip_day* ← get IPs which were active enough during a whole day mentioned in a *time_period*

*ip_day* ← sample *number_of_ip* addresses from *ip_day*

*ip_time_period* ← get addresses from *ip_day* satisfying a *minimum_connections* number within a *time_period* for *ip* in *ip_time_period*:

*features[ip]* = get_features_from_flow(*ip, time_period*)

return *features*

600 validate_model(*model, time_period, minimum_connections, number_of_ip*):

*ip_day* ← get IPs which were active enough during a whole day mentioned in a *time_period*

*ip_day* ← sample *number_of_ip* addresses from *ip_day*

*ip_time_period* ← get addresses from *ip_day* satisfying a *minimum_connections* number within a *time_period* for each *ip* in *ip_time_period*:

*public_information[ip]* ← check_public_source(*ip*)

*features* = get_features_from_flow(*ip, time_period*)

*predictions[ip]* ← model.predict(*features*)

return score(*public_information, predictions*)

FIGURE 6

MALWARE HOST NETFLOW ANALYSIS SYSTEM AND METHOD

FIELD

The disclosure relates generally to system and method for determining the behavior of a malware host using a netflow analysis and machine learning.

BACKGROUND

Malicious actors are present in the Global Internet, ranging from hackers themselves to infected zombie workers. Finding and blacklisting these malicious actors (and oftentimes other measures like taking sites down) is crucial to keep both companies and individual users safer. By the end of 2016, the Global Internet was estimated to have over 3.5 billion users, 1.1 billion hosts, over 1 billion websites and its traffic reached 1.1 zettabytes per year. The Global Internet's number of hosts, webpages, amount of traffic and possible packet transit routes are constantly growing. At the same time as this constant growth, the number of security experts, which are being able to analyze that data, is very limited. Unfortunately, currently, a great amount of internet security related tasks still rely on human cognition and expert judgment, making it unscalable and not able to keep up with the constant growth of the Global Internet.

There are many services that, in addition to providing blacklists, compute reputation scores (from blacklists, user reports, contextual relations between URLs, Passive DNS data and IP addresses that malware connects to, honeypots, crawlers). Alternatively, some systems have other ways of deciding which IP addresses to focus on first but most do not reveal their methods of choosing those if they are not trivial (e.g. observe IPs that attacked the honeypots).

The known methods and system to identify malicious actors are not scalable enough to analyze a whole netflow and therefore choosing some focus areas strictly limits the capabilities of such approaches. Most known methods prioritize finding data that have a reasonable level of confidence in to avoid False Positives (even though false positives still appear from time to time). Furthermore, innovations in internet crime (such as new types of malicious activity, new attack tools, new hardware types used to form botnets, etc.) makes confirming that addresses are malicious a very slow process and error prone process. Furthermore, in the past, due to lack of processing power, it was not possible to gather and successfully analyze netflows with machine learning techniques.

DETAILED DESCRIPTION OF ONE OR MORE EMBODIMENTS

The disclosure is particularly applicable to a malware host behavior determination system and method implemented on a wide area network, like the internet and it is in this context that the disclosure will be described. It will be appreciated, however, that the system and method has greater utility since it may be implemented in other ways that those disclosed below and may be used to determine host behavior for other networks in which it is desirable to be able to determine host behavior in order to detect malware. In an example set forth below, the system and method may be used to manage security services for a supply chain in which supply chain security is monitored. However, one skilled in the art understands that the disclosed system and method may be used for any system, network, etc. in which it is desirable to be able to determine host behavior in order to detect malware. It is also understood that the netflow data and hence the malicious host detection system and process described below may use data from different industries, such as the automobile industry or the semiconductor industry, and or from different geographic areas, such as Detroit or California.

Figure 1:
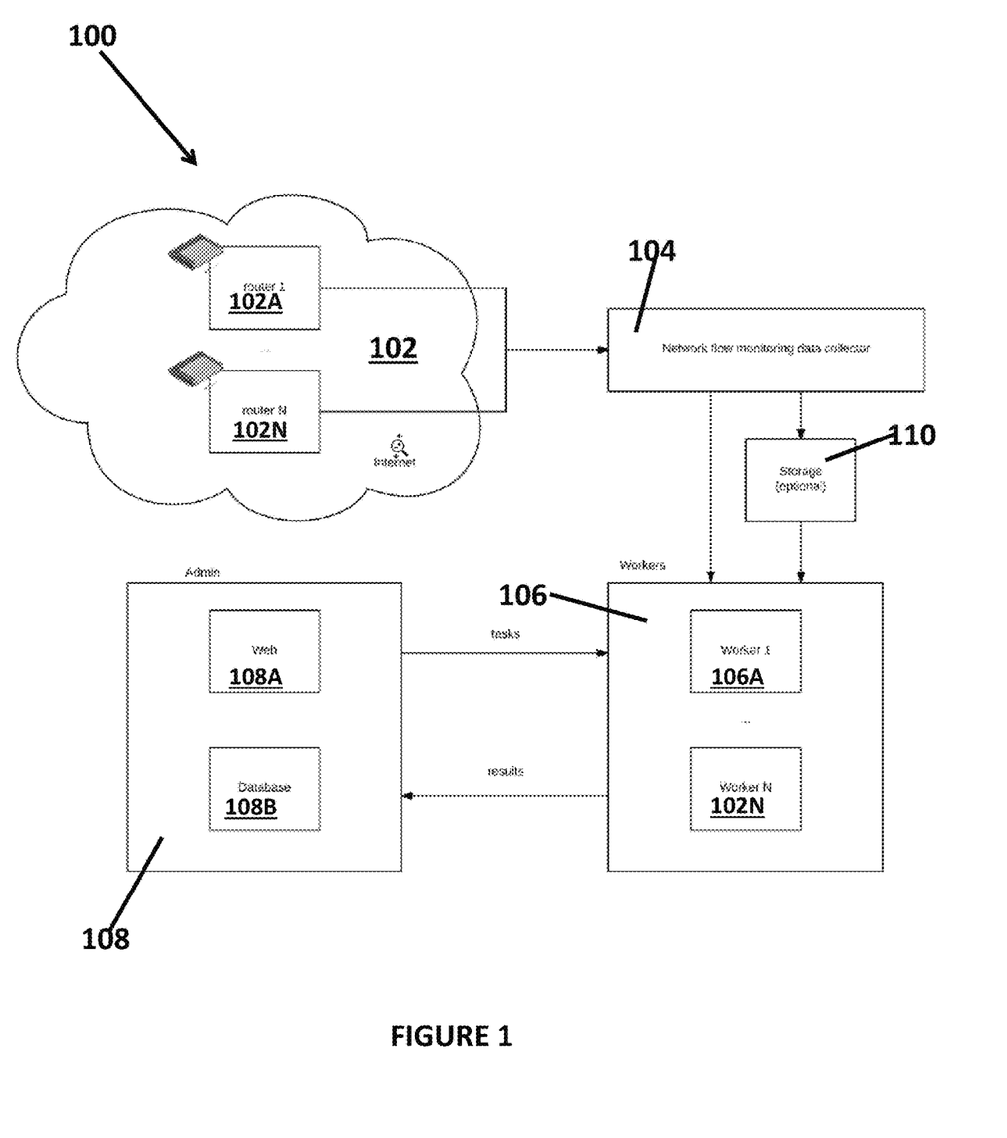
FIG. 1 illustrates an example of a system for determining malware host behavior using netflow and machine learning.

FIG. 1 illustrates an example of a system 100 for determining malware host behavior using netflow and machine learning. The system may have one or more elements that are coupled together by various wired or wireless communication paths. For example, the system may have a wide area network element 102, a network flow (netflow) monitoring data collector 104, a workers element 106, an administrative element 108 and an optional netflow storage element 110 that are coupled to each other as shown in FIG. 1. In general, the wide area network element 102, that may be the Internet, may further include one or more network routers 102A, . . . , 102N that further connect to a plurality of hosts (computer systems that are not shown in FIG. 1) whose behavior is determined by the system to detect malware. The wide area network element 102 may include one or more sub-networks that may be wired or wireless networks, computer networks, communication paths and the like to which the hosts are coupled.

The network flow (netflow) monitoring data collector 104 is coupled to the wide area network 102 and may gather netflow data from the various hosts that are connected to or coupled to the wide area network 102. The netflow monitoring data collector 104 may also collect known passive domain name service (DNS) data for the hosts. The netflow monitoring data collector 104 may be implemented in hardware or software. When implemented in software, the netflow monitoring data collector 104 may be a plurality of lines of computer code/instructions that may be stored and executed by a computer that has a processor and a memory such that the computer and processor are configured to perform the operations of the netflow monitoring data collector 104. When implemented in hardware, the netflow monitoring data collector 104 may be a hardware device, such as a microcontroller, programmable logic device, ASIC, etc. that operates and performs the operations of the netflow monitoring data collector 104.

The netflow monitoring data collector 104 may collect netflow data for the various hosts coupled to the wide area network 102 in which each netflow piece of data may include a data record that may contain at least a source internet protocol (IP) address and destination IP address for an interaction that occurs with a particular host. The netflow data used for the process described below may be reduced in volume since the total amount of netflow data is astronomical. For example, the netflow data may be limited by a time period (as described below), it may be limited to a particular industry (looking for malicious hosts in a particular industry) or it may be limited to a particular geographic area. A very simple example of a netflow for a particular host interaction may be:

| Date flow start | Duration | Proto | Src IP Addr:Port | | Dst IP Addr:Port | Packets | Bytes | Flows |
|---|---|---|---|---|---|---|---|---|
| 2010 Sep. 1 00:00:00.459 | 0.000 | UDP | 127.0.0.1:24920 | -> | 192.168.0.1:22126 | 1 | 46 | 1 |
| 2010 Sep. 1 00:00:00.363 | 0.000 | UDP | 192.168.0.1:22126 | -> | 127.0.0.1:24920 | 1 | 80 | 1 |

A netflow record for a particular interaction between a host and another computer may include a large amount of data about the particular traffic flow and the system may mine the following features from the netflow data:
 ts—start time
 to—end time
 td—duration
 sa—source address
 da—destination address
 sp—source port
 dp—destination port
 sas—source AS number
 das—destination AS number
 pr—protocol
 fig—TCP flag
 ipkt—input packets
 in—input bytes
 out—output bytes
 pps—packets per second
 bps—bytes per second
 bpp—bytes per packet Each of the above features is a known element of netflow data that may be extracted from the netflow data collected by the data collector 104. The storage 110 of the system may store the netflow data and the passive DNS data that is used by the system. The storage 110 may be a hardware storage device or a software based storage system.

The administrator element 108 and the worker element 106 may perform the processing of the system (shown in FIG. 2) using the netflow data to determine the behavior of the hosts to detect malware. The administrator element 108 and each of a web/application 108A and a database 108B that may be part of the administrator element 108 may be implemented in hardware or software or a combination of hardware and software. When the administrator element 108 is implemented in software, the administrator element 108 may have a plurality of lines of computer code/instructions that may be stored in a memory of a computer system that hosts the administrator element 108 and executed by a processor of the computer system so that the computer system and/or processor are configured to perform the operations of the system as described below. When the administrator element 108 or the sub elements 108A, 108B is implemented in hardware, the administrator element 108 may be a hardware device, such as a microcontroller, ASIC, programmable logic device, etc. that operates and performs the operations of the system as described below. The administrator element 108 may perform netflow mining, reporting and monitoring of the worker elements 106, manage the overall processing of the system and delivery results of the processing, such as a graphical user interface or data, to the user or another system. Web 108A generates a graphical interface for scheduling tasks for the workers. The storage 108B may store model results and other data generated by the system, user information and data and descriptions of tasks and whatever other data may be generated or needed by the system.

The worker element 106 is coupled to the administrator element 108 and may further have one or more worker elements 106A, . . . , 106N that perform the processing work of the system under the direction/management of the administrator element 108. As shown in FIG. 1, the administrator element 108 may communicate processing tasks to the workers 106A-106N and the workers may communicate results back to the administrator element 108. Each worker 106A-106N may be, for example, a thread. The worker element 106 and each worker element 108A-108N may be implemented in hardware or software or a combination of hardware and software. When the worker element 106 (or each worker 106A-106N) is implemented in software, it may have a plurality of lines of computer code/instructions that may be stored in a memory of a computer system that hosts the worker element 106 and executed by a processor of the computer system so that the computer system and/or processor are configured to perform the operations of the system as described below. When the worker element 106 or the sub elements 106A, . . . , 106N is implemented in hardware, the worker element 106 may be a hardware device, such as a microcontroller, ASIC, programmable logic device, etc. that operates and performs the operations of the system as described below. In one embodiment, the combination of the admin element 108 and the worker element 106 may use a message queue architecture controlled by the admin element 108 wherein each worker obtains tasks from the message queue to perform the processing tasks. Furthermore, in one embodiment, the admin and worker element 106, 108 may operate using chaining to efficiently use each worker to complete the tasks.

One of the tasks performed by the system is mining the netflow data for features of the host associated with the netflow. In particular, in order to quantify the behavior corresponding to IP addresses of the netflow data, the system and method mines the netflow data and calculates statistics based on the netflow features, examples of which were described above. In order to calculate statistics, the system and method may group all the flows by either destination and/or source address. An example of a resulting set of features may consist of:
 statistics grouped by source address—with suffix _sa
 statistics grouped by destination address—with suffix _da
 ratio between them given by dividing all _sa stats by _da stats—with suffix _ratio
 And the statistics may be:
 connections (all connections normalized by the recording time),
 neighbours (connection from/to unique addresses),
 td: mean, std, max
 sp: nunique (number of unique)
 dp: nunique
 pr: nunique
 flg: nunique
 ipkt: mean, std, max, min
 in: mean, median, std, max, min
 out: mean, median, std, max, min
 pps: mean, std, max
 bps: mean, std, max bpp: mean, median, std, max, min
for each value of pr: mean
for some cherry-picked values of flg: mean For example, in one embodiment with one set of exemplary data, the system and method may mine/gather forty-six statistics for _sa, _da and _ratio so that the system has 138 features in total. The above set of features and statistics are merely illustrative since the system and method may be used with various different data and may generate similar or different sets of features.

Figure 2:
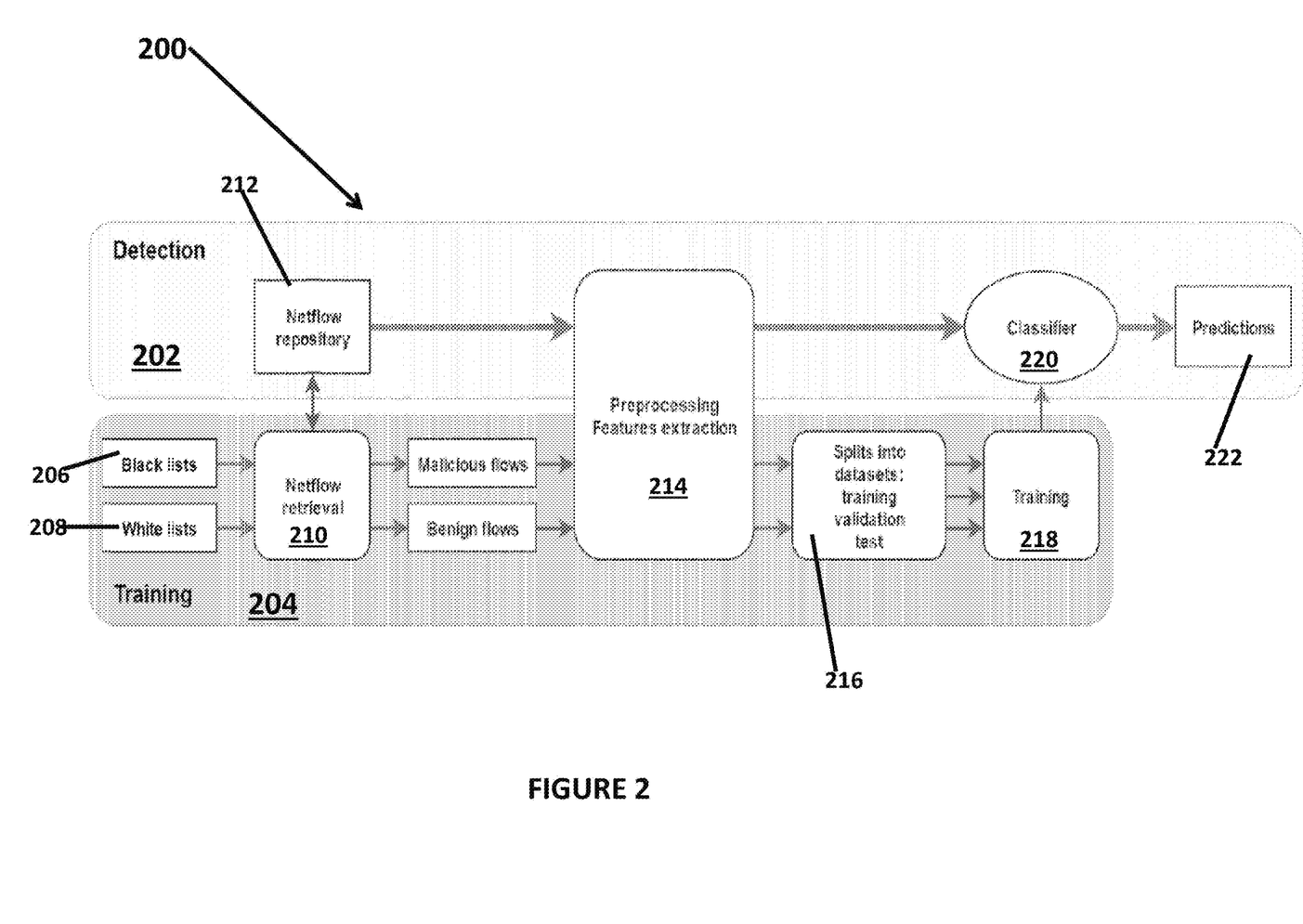
FIG. 2 illustrates a process for determining malware host behavior using netflow and machine learning.

FIG. 2 illustrates a process 200 for determining malware host behavior using netflow and machine learning. The processes shown in FIG. 2 may be implemented by the administrative element 108 and worker element 106 in FIG. 1, but may also be implemented in other manners or by other elements that are within the scope of the disclosure. The process 200 may include a detection process 202 and a training process 204 in which the detection process 202 uses the mined netflow data and performs machine learning processing to generate one or more predictions 222 about host behavior and the likelihood of malware. The training process 204 may prepare data for the analysis being performed and train the machine learning processes as described below.

As part of the training process, the system may generate/retrieve one or more black lists 206 and generate or retrieve one or more whitelists 208. A black list is a list of host/IP addresses wherein each host/IP address is known to host/distribute malware or perform malicious activities. An example of a blacklist may be:
1.1.1.7
1.1.1.2
1.1.1.3

A white list is a list of host/IP addresses wherein each host/IP address is known to not host/distribute malware or perform malicious activities. An example of a whitelist may be:
1.1.1.4
1.1.1.5
1.1.1.6

The one or more black lists may be based on data aggregated from multiple threat sources, both commercial and community-driven. The system may retrieve a commercially available Alexa most popular sites (with the probability of being included in the training set related to the position on the list (the more popular, the bigger chance to be included). Further details of the white list retrieved from Alexa may be found at http://www.alexa.com/siteinfo that is incorporated herein by reference. The method may also generate its own white list (self-generated whitelists) since according to experiments and some studies, most (over 75%) of network traffic is classified as benign (e.g. not malicious). The data also indicates that most random IP addresses over the Internet are benign and as such, can be included in the training set even though they are not on external whitelists. Some malicious IP addresses might get through, so the method may use previous iterations of the model to filter such "gray whitelist" to exclude the more obvious malicious servers. Further details of the generation of the white list are described in more detail with reference to FIG. 3 below.

The training process may then retrieve the netflow data (210) and using the white lists 208 and black lists 206 and the netflow data, generate a set of flows in the netflow data known to be malicious and a set of flows in the netflow data known to be benign based on the white lists and black lists. The process may then perform feature extraction (214), using for example, the features set forth above, and the statistics calculation using the netflow data as described above. The features may be obtained by aggregating flow(s) for each host. In one example, the statistics may be based on a number of flows, protocol(s), flag (s), port(s), autonomous systems, a number of packages sent/received, byte size of flows and/or type of service. In one example, the above features may be calculated separately for incoming and outcoming flows and a ratio of obtained pairs of values is used as a feature as well.

The generated statistics, the raw Netflow statistics described above and the extracted features may be used by a machine learning process classifier (220) with a model to generate the predictions (222) about the behavior of the hosts. An example of the predictions output from the system may be:
2.1.1.2,0.9975
2.1.1.3,0.1326
2.1.1.4,0.0004
2.1.1.5,0.5779
2.1.1.6,0.0378
2.1.1.7,0.8931

The machine learning process classifier may be trained with input from the features that are split into datasets including a training data set and a validation data set (216) so that a known machine learning training process (218) may be performed to train the model of the classifier process (220) and the method.

The method 200 disclosed may use the classifier process (220), that uses machine learning classification models, to differentiate between malicious and benign hosts and thus identify/determine a behavior of each host and thus a likelihood that the host stores/distributes malware using the netflows, the generated white lists and machine learning that provide a technical solution to the problem described above of determining host behavior and identifying malicious hosts. An example of a malicious host may be a CnC (command and control) server which infects other hosts with malware or spreads the botnet to other hosts. Such a botnet can then perform spamming, DDoS (denial of service) attacks or brute force attacks. In contrast, a benign host is a host that does not perform the actions of the malicious host. The technical solution is provided using the combination of external blacklists and possibly generated white lists, netflow data and machine learning. The system and method may be implemented using various different machine learning algorithms and models. For example, the method may use a known random forests machine learning classifier. However, the method 200 may also use decision trees, statistical classifiers, artificial neural networks, supervised learning, unsupervised learning, clustering algorithms, and the like. The trained models may be used to score a network activity or distinguish between different types of cyber threats. The model may be validated as described below with reference to FIG. 5.

In the method 200 in FIG. 2 and the system 100 shown in FIG. 1, the data being used for the determination of host behavior (historical flows, extracted white and blacklists, computed features) may be kept in file structures (e.g. binary files or comma separated values) in computer data storage. The storage may also store the computer code that is used to implement the elements shown in FIG. 1 that may be used to perform the processes of the method 200 in FIG. 2.

The method 200 may generate an output of the determination of malicious hosts and benign hosts. The method 200, for example, may output a score, which can be used for ordering IP addresses of hosts for experts to check/confirm.

The score may be a single number in range (0, 1) for each IP address for each host. Additional methods for threat classification can be used to suggest a most probable reason for a high maliciousness score. That data can be later used for suggesting actions for network and security operators or deeper investigation done by domain experts.

Figure 3:
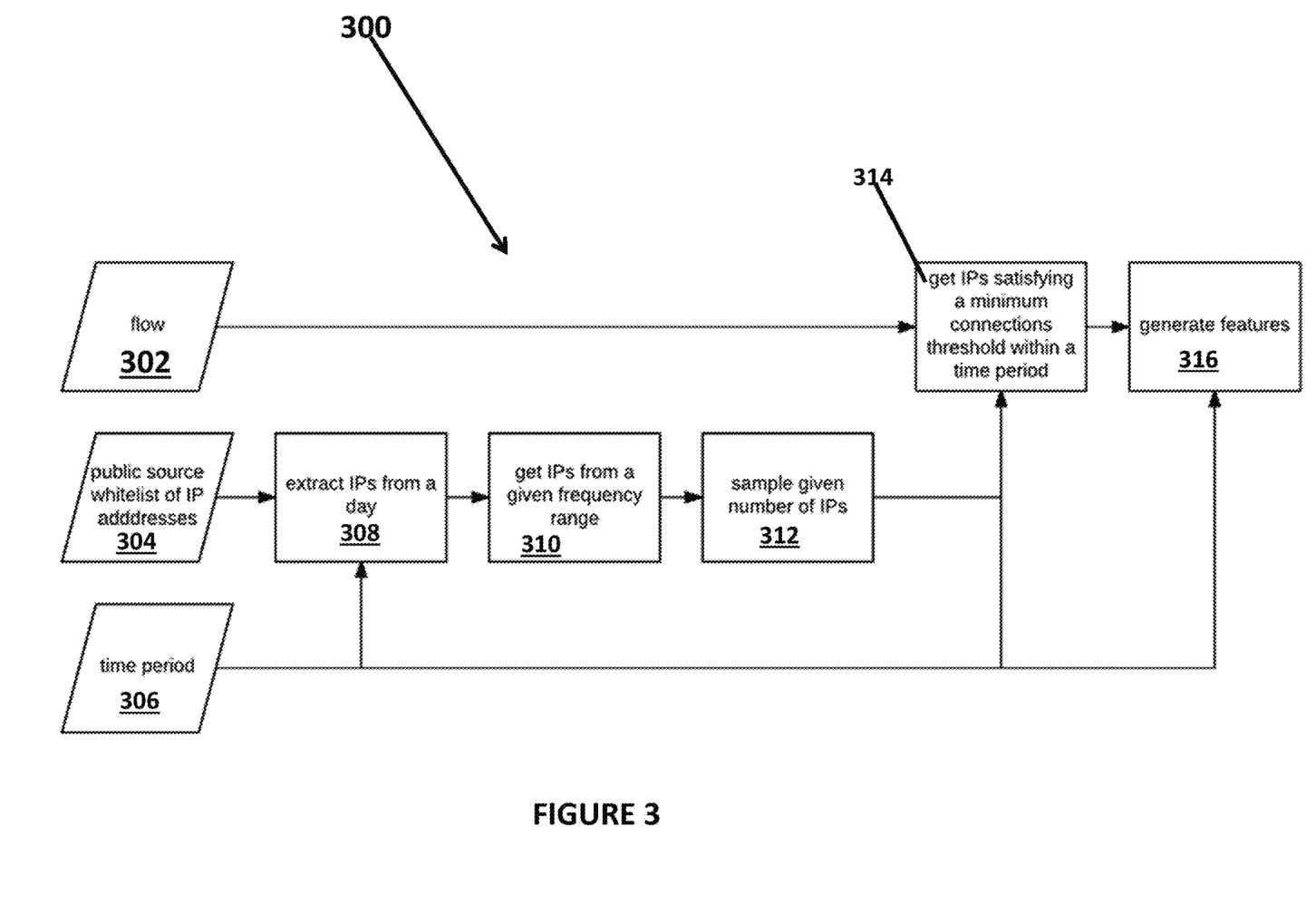
FIG. 3 illustrates a method for whitelist generation.
Figure 4:
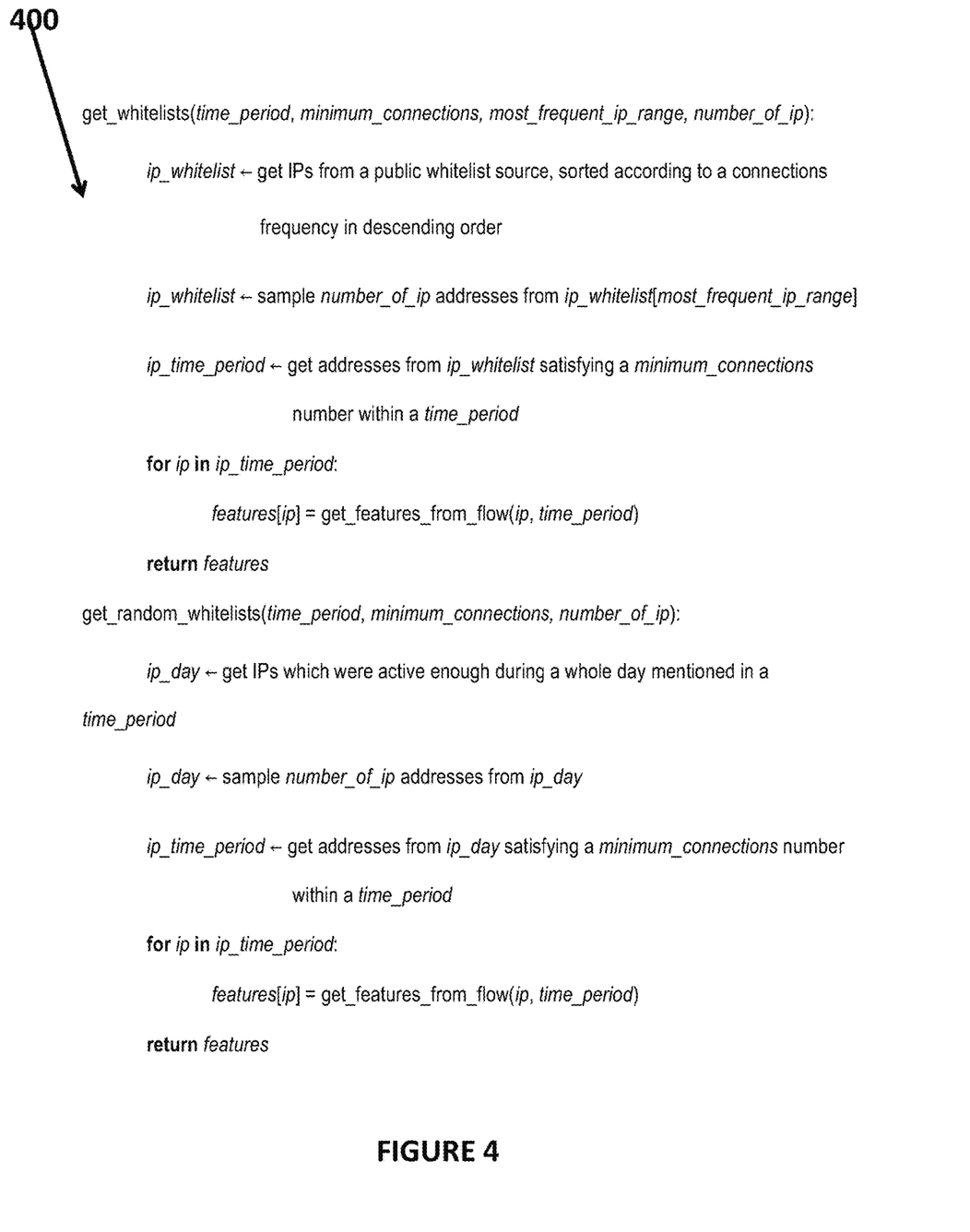
FIG. 4 illustrates an example of pseudocode that may be used to generate a whitelist using the method in FIG. 3.

FIG. 3 illustrates a method 300 for white list generation. In one embodiment, the white list generation may be performed by the worker element 206 and the admin element 208 of the system in FIG. 1. In the method, netflow data (302), a public source white list of IP addresses (304) and a time period (306) may be input into the method. For example, the time period may be a 3-6 hour window of netflows. Using the time period data, the method may extract IP addresses from a day 308 (based on the date of the traffic in the netflow data), obtain the IP addresses from a given frequency range (310) and then sample a given number of the IP addresses (312). Then, using the netflow data and the sample IP addresses from the white list, the method may retrieve/identify any IP addresses satisfying a minimum connections threshold with the time period (314). In one example, the threshold may be twenty inbound and twenty outbound connections registered in Netflow for a 1-3 hour window although the threshold may be adjusted. The method may then generate the features (316). FIG. 4 illustrates an example of pseudocode that may be used to generate a whitelist using the method in FIG. 3. The white list generated by the method 300 in FIG. 3 may be used as part of the method 200 in FIG. 2.

Figure 5:
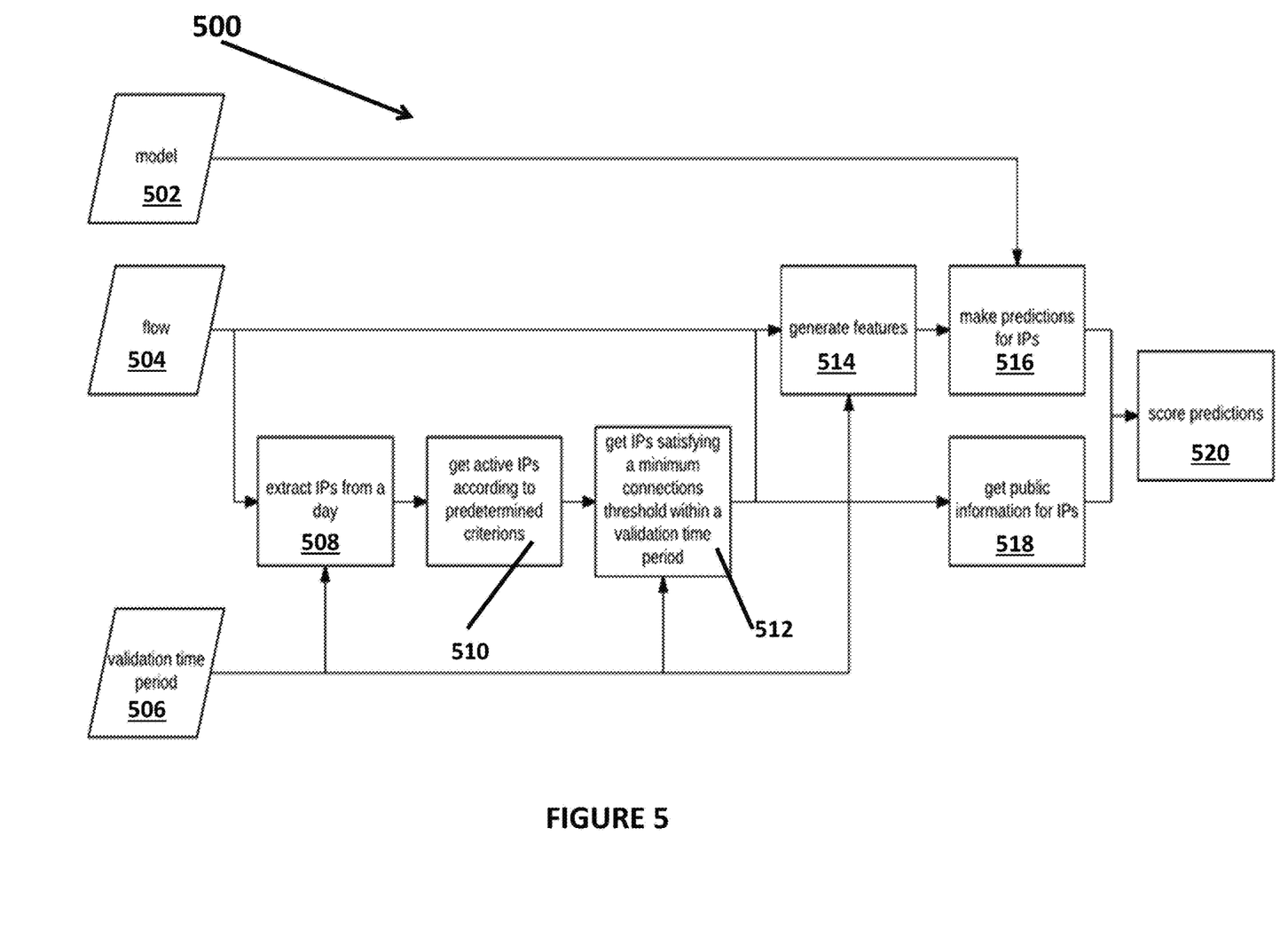
FIG. 5 Illustrates a method for model validation.
Figure 6:
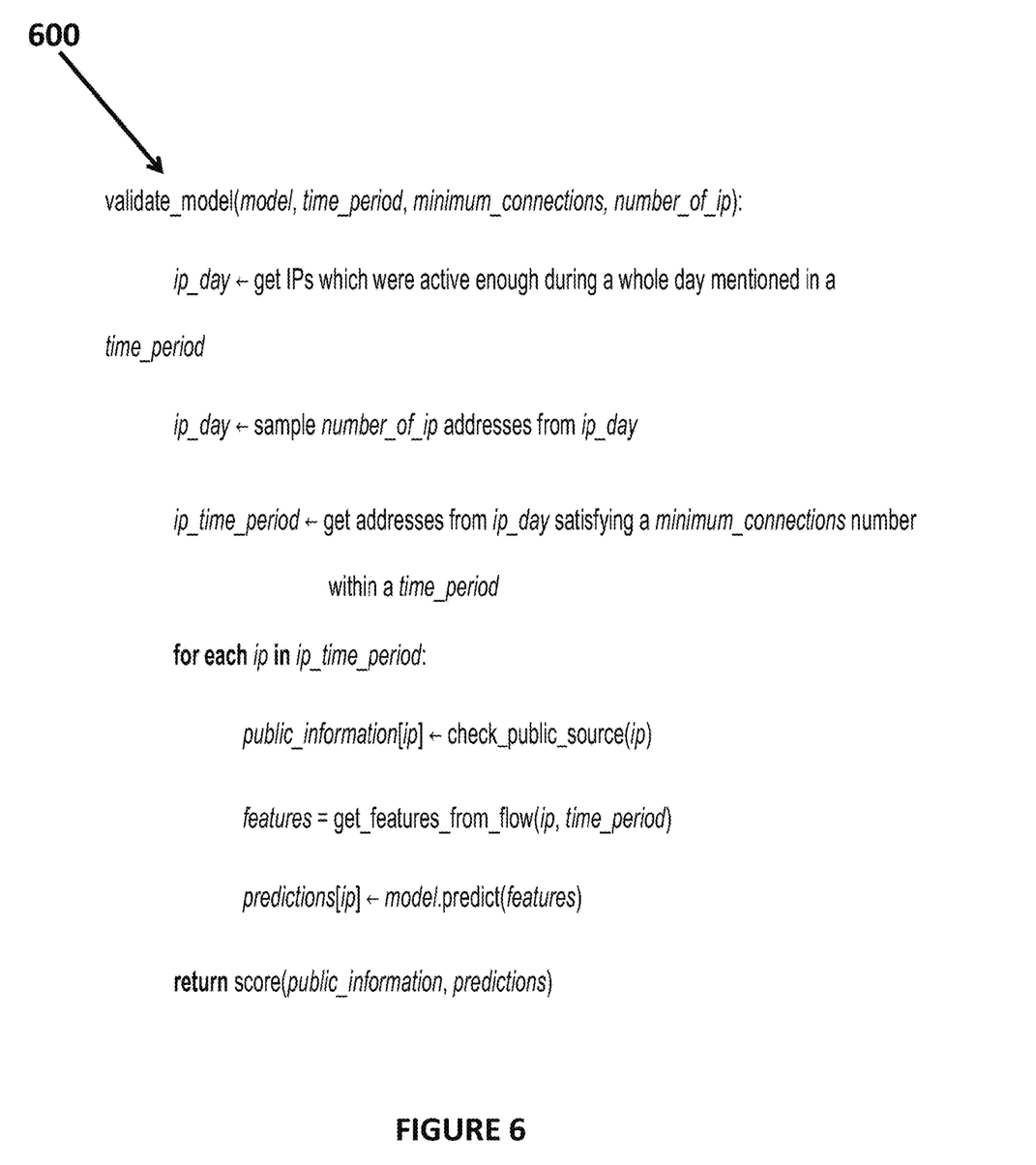
FIG. 6 illustrates an example of pseudocode that may be used to validate models.

FIG. 5 illustrates a method 500 for model validation and FIG. 6 illustrates an example of pseudocode that may be used to validate models. In one embodiment, the model validation may be performed by the worker element 206 and the admin element 208 of the system in FIG. 1. In the method, a model (502), a set of netflow data (504) and a validation time period (506) may be input into the method. Using the netflow data and the validation time period, the method may extract IP addresses from the netflow data for a day (508) and get active IP addresses according to predetermined criteria (510). For example, the predetermined criteria may be a number exceeding the threshold described above. The method may then retrieve/identify any IP addresses satisfying a minimum connections threshold with the validation time period (512) as described above. The method may then generate features (514) using the netflow data, the validation time period and the IP addresses that satisfy the criteria. The method may also obtain public information for the IP addresses (518). Using the generated features and the model 502, the method may then make predictions for the IP addresses (516). The predictions and the public information may then be used to score the predictions (520) and determine the validity of the model by comparing the predictions with the model to the public information. In the above process, the system verifies and validates the model using outside sources and may compare the scores generated for IPs (pair of [IP,score]) against the ground truth from an external blacklist.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A system for determining if a host having an internet protocol (IP) address is malicious, the system comprising:
   a computer having a processor, memory and a plurality of instructions so that the processor is configured to:
   receive a set of netflow data wherein each piece of netflow data contains data about data traffic between a source internet protocol (IP) address of a host and a destination IP address, a black list that contains a list of one or more hosts that are malicious and a white list that contains a list of one or more hosts that are benign;
   apply a classifier machine learning model to a set of features generated from the set of netflow data, the black list and the white list; and
   generate a prediction using the classifier machine learning model for at least one of the hosts in the set of netflow data whether the host is malicious.

2. The system of claim 1, wherein the processor is further configured to train the classifier machine learning model.

3. The system of claim 1, wherein the processor is further configured to validate the classifier machine learning model using public information about an IP address of a host.

4. The system of claim 1, wherein the processor is further configured to generate the white list.

5. The system of claim 1, wherein the processor is further configured to extract one or more features from the set of netflow data.

6. A method for determining if a host having an internet protocol (IP) address is malicious, the method comprising:
receiving a set of netflow data wherein each piece of netflow data contains data about data traffic between a source internet protocol (IP) address of a host and a destination IP address, a black list that contains a list of one or more hosts that are malicious and a white list that contains a list of one or more hosts that are benign;
applying a classifier machine learning model to a set of features generated from the set of netflow data, the black list and the white list; and
generating a prediction using the classifier machine learning model for at least one of the hosts in the set of netflow data whether the host is malicious.

7. The method of claim 6 further comprising training the classifier machine learning model.

8. The method of claim 6 further comprising validating the classifier machine learning model using public information about an IP address of a host.

9. The method of claim 6 further comprising generating the white list using the set of netflow data.

10. The method of claim 6 further comprising extracting one or more features from the set of netflow data.

11. A method for generating a white list, comprising:
receiving a set of netflow data wherein each piece of netflow data contains data about data traffic between a source internet protocol (IP) address of a host and a destination IP address and a public white list of IP addresses;
extract a predetermined number of IP addresses from the public white list;
generating a plurality of IP addresses for hosts from the set of netflow data that satisfy a minimum connections threshold being a predetermined number of inbound and outbound connections during a predetermined period of time; and
generate a set of features for the hosts that satisfy the minimum connections threshold to produce a new white list.

12. The method of claim 11, wherein extracting the IP addresses further comprises extracting the IP addresses within a time period.

13. The method of claim 12, wherein extracting the IP addresses further comprises extracting IP addresses for hosts during a day and obtaining IP addresses from a given frequency range.

14. A method for validating a machine learning classifier model, comprising:
receiving a set of netflow data wherein each piece of netflow data contains data about data traffic between a source internet protocol (IP) address of a host and a destination IP address and a classifier model;
obtaining a plurality of IP addresses for hosts from the set of netflow data that satisfy a minimum connections threshold;
generating a plurality of features from the set of netflow data;
predicting, using the classifier model and the generated features, a host having an IP address that is malicious; and
scoring the predicted host based in public IP address information to validate the classifier model.

15. The method of claim 14, wherein obtaining the plurality of IP addresses for hosts that satisfy a minimum connections threshold further comprises obtaining the plurality of IP addresses for hosts that satisfy a minimum connections threshold within a validation time period.

16. The method of claim 15, wherein obtaining the plurality of IP addresses for hosts that satisfy a minimum connections threshold further comprises extracting IP addresses for hosts during a day and obtaining active IP addresses that meet predetermined criteria.

* * * * *